(12) United States Patent
Hashimoto

(10) Patent No.: US 7,810,933 B2
(45) Date of Patent: Oct. 12, 2010

(54) IMAGE PROJECTION APPARATUS

(75) Inventor: Shigeki Hashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 11/699,144

(22) Filed: Jan. 29, 2007

(65) Prior Publication Data
US 2007/0188716 A1  Aug. 16, 2007

(30) Foreign Application Priority Data
Jan. 30, 2006  (JP) .............................. 2006-021470
May 29, 2006  (JP) .............................. 2006-148423

(51) Int. Cl.
H04N 7/00  (2006.01)
G03B 21/28  (2006.01)

(52) U.S. Cl. .......................................... 353/98; 348/37
(58) Field of Classification Search .................. 353/94, 353/37, 98, 99, 30, 31; 359/219.1, 216.1, 359/217.4, 217.2; 348/36, 37
See application file for complete search history.

(56) References Cited

U.S. PATENT DOCUMENTS 6,674,415 B2 *  1/2004  Nakamura et al. ............ 345/32
6,871,958 B2 *  3/2005  Streid et al. .................... 353/37
7,111,943 B2 *  9/2006  Agostinelli et al. ........... 353/79
7,334,902 B2 *  2/2008  Streid et al. .................... 353/98
7,420,177 B2 *  9/2008  Williams et al. ....... 250/370.08
2003/0164901 A1 *  9/2003  Ouchi et al. ................. 348/744

FOREIGN PATENT DOCUMENTS

| | | |
|---|---|---|
| JP | 2001-083601 A | 3/2001 |
| JP | 2001-265275 A | 9/2001 |
| JP | 2003-207730 | 7/2003 |
| JP | 2007-514196 A | 5/2007 |
| WO | 2005/062609 A1 | 7/2005 |

* cited by examiner

*Primary Examiner*—Georgia Y Epps
*Assistant Examiner*—Ryan Howard
(74) *Attorney, Agent, or Firm*—Wolf, Greenfield & Sacks, P.C.

(57) ABSTRACT

An image projection apparatus includes a one-dimensional spatial light modulating element and a polygon scanner having four or five mirror facets. The polygon scanner scans a light beam modulated by the one-dimensional spatial light modulating element in a direction that is substantially perpendicular to the length direction of the one-dimensional spatial light modulating element so as to display an image.

1 Claim, 12 Drawing Sheets

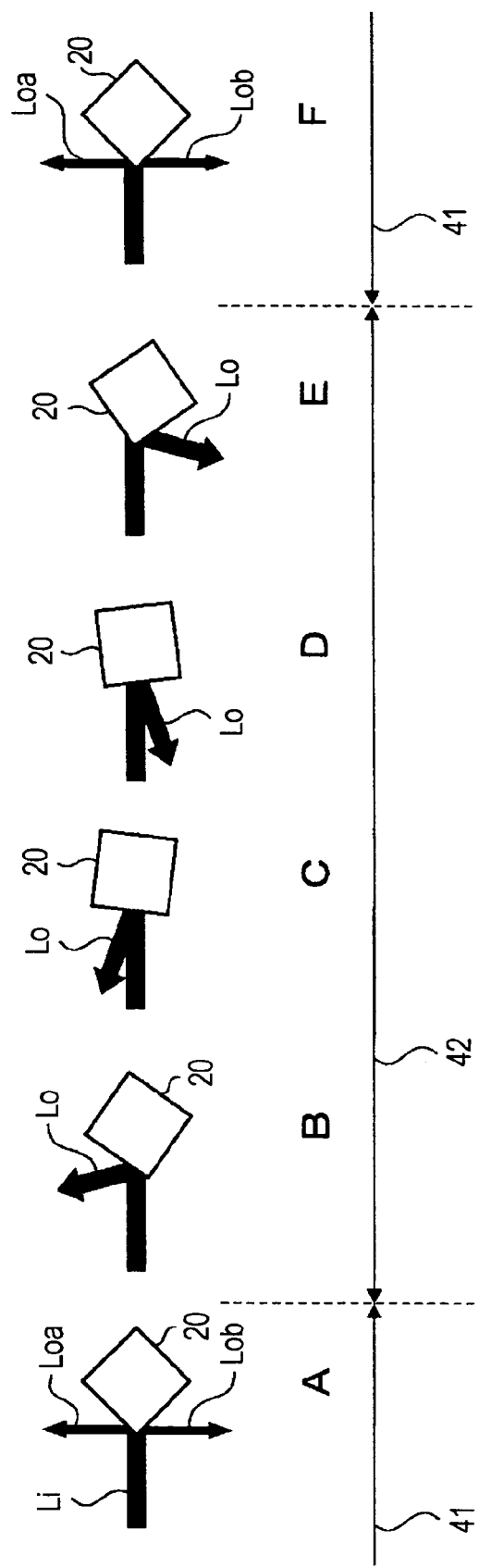

20

IMAGE PROJECTION APPARATUS

CROSS REFERENCES TO RELATED APPLICATIONS

The present invention contains subject matter related to Japanese Patent Application JP 2006-148423 filed in the Japanese Patent Office on May 29, 2006 and Japanese Patent Application JP 2006-021470 filed in the Japanese Patent Office on Jan. 30, 2006, the entire contents of which are incorporated herein by reference.

BACKGROUND OF THE INVENTION

1. Field of the Invention

The present invention relates to an image projection apparatus for projecting light modulated by a one-dimensional spatial light modulating element in accordance with image information and displaying an image.

2. Description of the Related Art

To provide a sense of presence to viewers, displays need to have a high resolution, a wide color range, a wide field of view, and a high frame rate. In general, when a wide field of view is achieved using one projector, light is projected onto a very large screen or a curved screen using a two-dimensional spatial light modulating element, such as a liquid crystal panel or a digital micromirror device (DMD) However, in such a case, the quality of an image displayed at the end of the screen, in particular, at the four corners of the screen deteriorates, and therefore, the excellent image quality and the wide field of view cannot be provided at the same time.

In contrast, a one-dimensional spatial light modulating element can display a two-dimensional image by using a mechanism of scanning a light beam across the screen in a direction perpendicular to the long axis (length direction) of the spatial light modulating element. A post projection scanning method in which the scanning mechanism is disposed after a projection lens can easily achieve a wide field of view in a relatively narrow projection space. In addition, when a projection image surface is a cylindrical screen, the image quality does not deteriorate at the four corners of the screen. Therefore, a wide field of view can be advantageously achieved without degrading the image quality (refer to, for example, Japanese Unexamined Patent Application Publication No. 2003-207730).

SUMMARY OF THE INVENTION

However, in a system, such as the Megavision, that projects light of a horizontally long image, use of a plurality of projectors is needed. When a plurality of projectors are used, the size of the system is increased and the structure of the system becomes complicated.

In particular, an image projection apparatus has not been developed that can display a horizontally long image at a high frame rate.

Accordingly, the present invention provides an image projection apparatus capable of displaying a horizontally long image with an excellent image quality.

According to an embodiment of the present invention, an image projection apparatus includes a one-dimensional spatial light modulating element and a polygon scanner having four or five mirror facets. The polygon scanner scans a light beam modulated by the one-dimensional spatial light modulating element in a direction that is substantially perpendicular to the length direction of the one-dimensional spatial light modulating element so as to display an image.

In addition, the polygon scanner of the image projection apparatus can display the image on a cylindrical surface.

According to another embodiment of the present invention, an image projection apparatus includes a one-dimensional spatial light modulating element and a polygon scanner configured to scan a light beam modulated by the one-dimensional spatial light modulating element in a direction that is substantially perpendicular to the length direction of the one-dimensional spatial light modulating element so as to display an image. The rotation speed of the polygon scanner is controlled in accordance with a resolution of an image signal in a scan direction or a frame rate of an image signal.

In addition, the polygon scanner of the image projection apparatus can have four or five mirror facets.

According to another embodiment of the present invention, an image projection apparatus include two modulation optical systems, each modulating and outputting a light beam using a one-dimensional spatial light modulating element, and a polygon scanner configured to scan the light beam modulated by the one-dimensional spatial light modulating element to form a two-dimensional image. Each of optical axes of the two modulation optical systems is eccentric with respect to a rotation axis of the polygon scanner.

In the image projection apparatus according to the present invention, as noted above, the polygon scanner having four or five mirror facets scans a light beam modulated by the one-dimensional spatial light modulating element in a direction that is substantially perpendicular to the length direction of the one-dimensional spatial light modulating element so as to display an image. By using the polygon scanner having four or five mirror facets as a scanning unit of the light modulated by the one-dimensional spatial light modulating element, the image projection apparatus can display a horizontally long image with high light use efficiency and without degrading the quality of the image.

In addition, by controlling the rotation speed of the polygon scanner in accordance with the resolution of an image signal in a scan direction or the frame rate of an image signal, the image projection apparatus can display a horizontally long image at any desired frame rate from a low to high frame rate without degrading the quality of the image.

Furthermore, by disposing the two modulation optical systems and the one polygon scanner so that each of optical axes of the two modulation optical systems is eccentric with respect to a rotation axis of the polygon scanner, the image projection apparatus can display a horizontally long image with an excellent image quality for two modulation optical systems at a high frame rate.

As noted above, according to the present invention, a horizontally long image having an excellent image quality can be displayed.

BRIEF DESCRIPTION OF THE DRAWINGS

FIGS. 6A to 6F illustrate effective scan periods and ineffective scan periods;

DESCRIPTION OF THE PREFERRED EMBODIMENTS

Exemplary embodiments of the present invention are described below with reference to the accompanying drawings. However, it should be noted that the present invention is not limited thereto.

Figure 1:
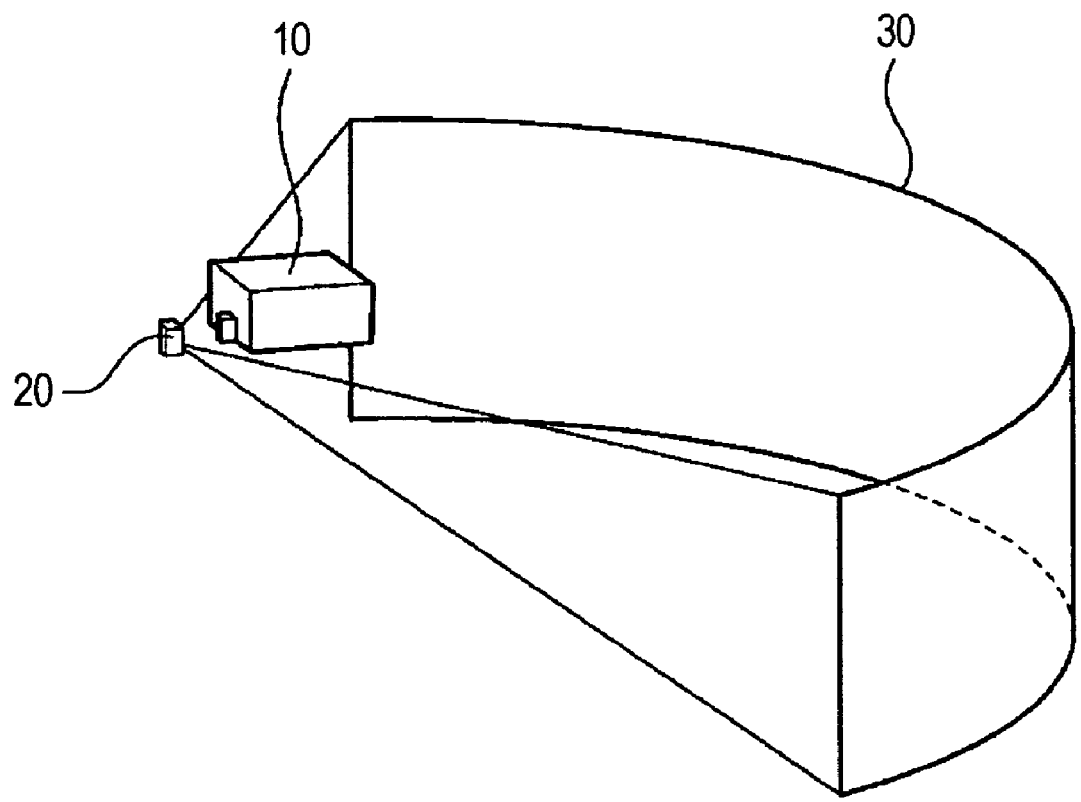
FIG. 1 is a schematic illustration of a structure of an image projection apparatus according to an embodiment of the present invention.

FIG. 1 is a schematic illustration of the structure of an image projection apparatus according to an embodiment of the present invention. An image projection apparatus 100 includes a modulation optical system 10 for modulating light using a one-dimensional spatial light modulating element and outputting the modulated light and a polygon scanner 20 for scanning the light output from the modulation optical system 10 in a direction perpendicular to the length direction of the one-dimensional spatial light modulating element and displaying an image on a screen 30.

Figure 2:
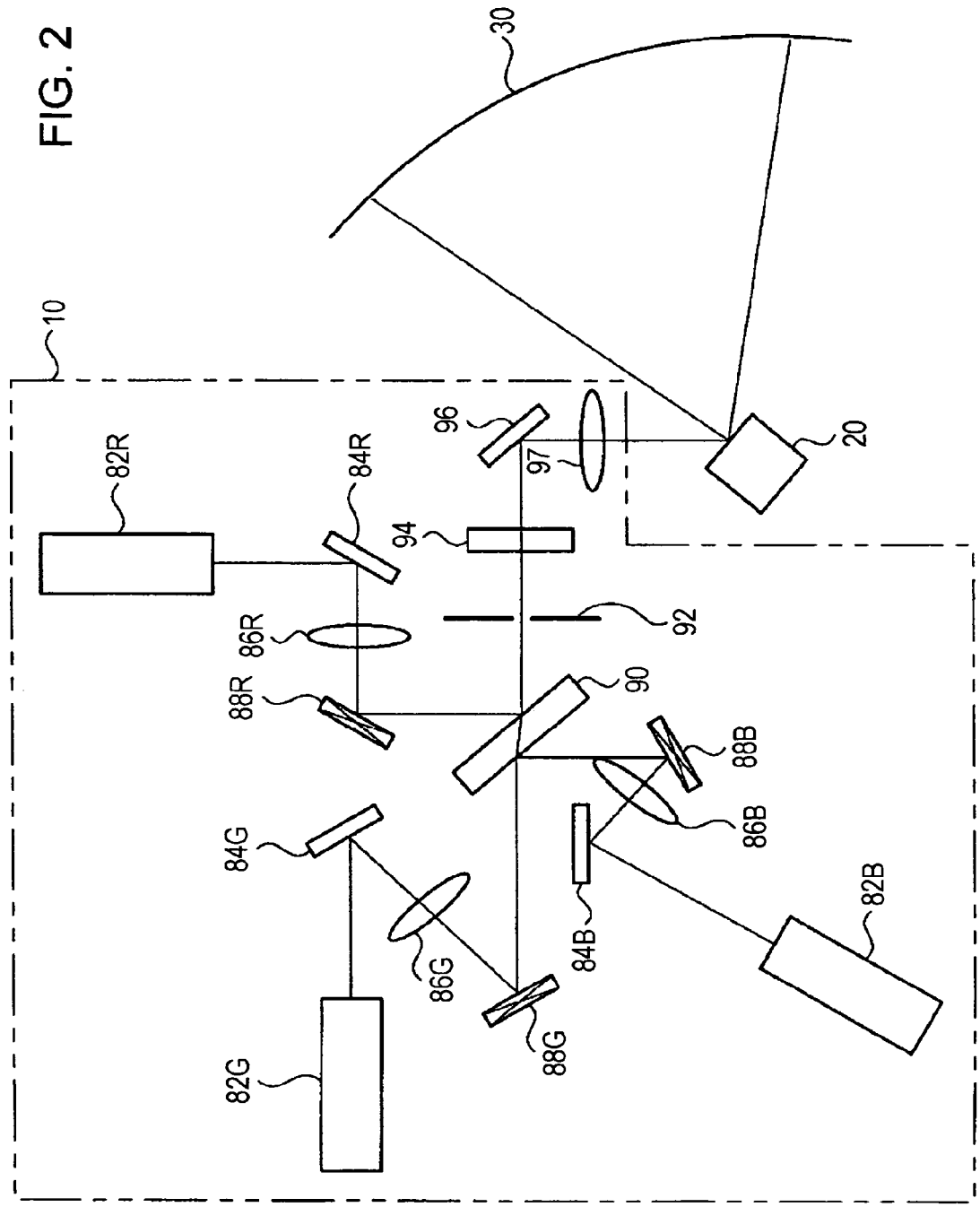
FIG. 2 is a schematic illustration of a main portion of the modulation optical system of the image projection apparatus according to the embodiment of the present invention.

FIG. 2 is a schematic illustration of an exemplary structure of the modulation optical system 10 of the image projection apparatus according to the embodiment of the present invention. This image projection apparatus including the modulation optical system 10 is used for a large-screen projector and, in particular, a digital-image projector or a computer-image projector.

As shown in FIG. 2, the modulation optical system 10 includes a red (R) laser light source 82R, a green (G) laser light source 82G, and a blue (B) laser light source 82B. The modulation optical system 10 further includes a mirror 84R, an illumination optical system (lens group) 86R, and a diffractive one-dimensional spatial light modulating element 88R serving as an optical modulation element in this order along the optical axis of the red laser beam emitted from the red laser light source 82R. Similarly, the modulation optical system 10 further includes a mirror 84G, an illumination optical system (lens group) 86G, and a diffractive one-dimensional spatial light modulating element 88G serving as an optical modulation element in this order along the optical axis of the green laser beam emitted from the green laser light source 82G. The modulation optical system 10 further includes a mirror 84B, an illumination optical system (lens group) 86B, and a diffractive one-dimensional spatial light modulating element 88B serving as an optical modulation element in this order along the optical axis of the blue laser beam emitted from the blue laser light source 82B. As will be described below, the illumination optical systems (lens groups) 86R, 86G, and 86B can reshape the light beam so that the light beams emitted from the laser light sources can efficiently illuminate the diffractive one-dimensional spatial light modulation elements 88R, 88G, and 88B. Additionally, the modulation optical system 10 includes a color combining filter 90 (such as a dichroic mirror) for combining the red, green, and blue laser beams modulated by the diffractive one-dimensional spatial light modulating elements 88R, 88G, and 88B, respectively, a spatial filter 92, a diffuser 94, a mirror 96, and a lens 97. The modulated light beam output from the modulation optical system 10 is scanned by the polygon scanner 20 and is projected onto the screen 30. The screen 30, for example, has a substantially cylindrical surface whose center of curvature lies on or very near the rotation center axis of the polygon scanner 20.

The laser light source 82R of the modulation optical system 10 can include a laser diode that emits a red light beam having, for example, a wavelength of 642 nm and an optical output power of about 3 W. The laser light source 82G can include a laser diode that emits a green light beam having, for example, a wavelength of 532 nm and an optical output power of about 2 W. The laser light source 82B can include a laser diode that emits a blue light beam having, for example, a wavelength of 457 nm and an optical output power of about 1.5 W. However, the wavelengths and the optical output power of the laser light sources 82R, 82G, and 82B are not limited to these values.

Each of the one-dimensional diffractive light modulation elements 88R, 88G, and 88B can include, for example, an electrostatic driving device, such as a micro electro mechanical system (MEMS) using an electrostatic driving method. More specifically, an electrostatic driving device can be used in which a lower electrode is formed on a substrate and thin-film ribbon beams that serve as upper electrodes and that are electrically insulated from the lower electrode by space are arranged in a bridge shape so as to face the lower electrode. Each of the upper electrodes is displaced due to an electrostatic force or an electrostatic resistance force induced between the upper electrode and the lower electrode in accordance with electric potentials applied to the upper electrode and the lower electrode. For example, by displacing every other upper electrode towards the lower electrode formed on the substrate, this electrostatic driving device can function as a diffraction grating. When a coherent light beam is used, the intensity of a reflected light beam in a specific direction can be continuously and finely changed using the interference of light so as to change the gradation. In practice, several hundred to one thousand electrostatic driving devices, each including two or more beams (upper electrodes) arranged in parallel, are arranged in parallel for the same number of pixels. Thus, this electrostatic driving device can be used as a one-dimensional light modulation element. An example of an available commercial one-dimensional light modulation element is the Grating Light Valve (GLV) available from Silicon Light Machine, Inc.

In the modulation optical system 10 having such a structure, the red, green, and blue laser light beams emitted from the laser light sources 82R, 82G, and 82B are simultaneously input from the illumination optical systems 86R, 86G, and 86B to the one-dimensional spatial light modulating elements 88R, 88G, and 88B via the mirrors 84R, 84G, and 84B, respectively.

In addition, these laser light beams are diffracted by the one-dimensional spatial light modulating elements 88R, 88G, and 88B, respectively, so as to be spatially modulated. These diffracted light beams of three colors are combined by the color combining filter 90. Thereafter, only signal components are retrieved from the combined light beam by the spatial filter 92.

Subsequently, the diffuser 94 reduces the degree of laser speckle in the RGB image signal. The RGB image signal via the mirrors 96 and 97 is expanded in a space by the scanning illumination system (e.g., four- or five-facet polygon scanner 20) that operates in synchronization with the image signal. Note that the four-facet polygon scanner 20 is shown as an example in FIG. 5. Thus, the RGB image signal is projected onto the screen 30 to form a full-color image.

As noted above, in a post-projection method in which the polygon scanner 20 is disposed after the lens 97, since only the light beam that has passed through a core area of the lens 97 is used, the deterioration of image quality at the corners of the screen 30 is reduced. Accordingly, a video that is clearly viewed even at the corners of the screen 30 and, thus, provides an excellent image quality can be projected.

Additionally, when a known image projection apparatus including a two-dimensional light modulation element, such as a liquid crystal panel or a DMD, projects the light of an image onto a cylindrical screen, the produced image is distorted at the four corners of the screen. Accordingly, it is difficult to obtain a clear image on the entire area of the cylindrical screen. Thus, the image is divided for polyhedral surfaces and the light of divided images is projected. However, by using the image projection apparatus according to the present embodiment, a horizontally long image without a border line can be displayed on a cylindrical screen. In addition, this image can have the excellent image quality without distortion at the four corners of the screen. By using a cylindrical screen, a wide field of view can be easily obtained compared with a flat screen. In addition, this wide field of view and high resolution of the produced image can be obtained without adding an extra image projection apparatus.

When such a one-dimensional light modulation element and a polygon scanner are used in an image projection apparatus, the height of the image is determined by the multiplication factor of the lens 97 for projection whereas the width of the image (the scanning angle) is determined by the number of mirror facets of the polygon scanner.

Accordingly, for a known image projection apparatus, the aspect ratio of the image projected onto a screen is determined by only the performance of a lens. In contrast, for the image projection apparatus according to the present embodiment, the aspect ratio of the image can be freely determined.

The light use efficiency is described next when the light beam modulated by the above-described diffractive one-dimensional light modulation element is scanned by the polygon scanner.

Figure 3:
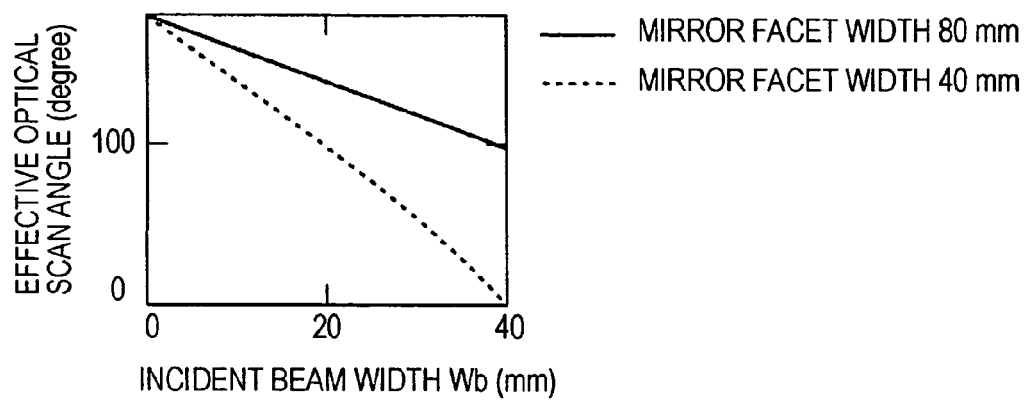
FIG. 3 is a graph illustrating a relationship between an incident beam width and an effective optical scan angle.

The image projection angle in the scan direction is determined by the design of the polyhedral mirror of the polygon scanner. The effective optical scan angle Θ is determined as follows:

$$\Theta = 4\left[\frac{180°}{Nm} - \arcsin\left\{\frac{Wb}{Wm}\sin\left(\frac{180°}{Nm}\right)\right\}\right] \quad (1)$$

where Wb represents the incident beam width on a mirror facet of the polygon scanner, Wm represents the width of the mirror facet, and Nm represents the number of mirror facets. As shown in FIG. 3, the effective optical scan angle varies in accordance with the incident beam width Wb. In FIG. 3, the number of mirror facets is four. The solid line indicates a graph when the width of the mirror facet is 80 mm. The dotted line indicates a graph when the width of the mirror facet is 40 mm. As the incident beam width increases, the time period when the beam is divided by the ridge portion formed by two mirror facets increases.

In contrast, the scan efficiency Eff that represents the ratio of the time period when the beam is not divided by the ridge portion of the polygon scanner to the total scan time is given by the following equation:

$$Eff = \frac{Nm \times \Theta}{720°} \quad (2)$$

Figure 4:
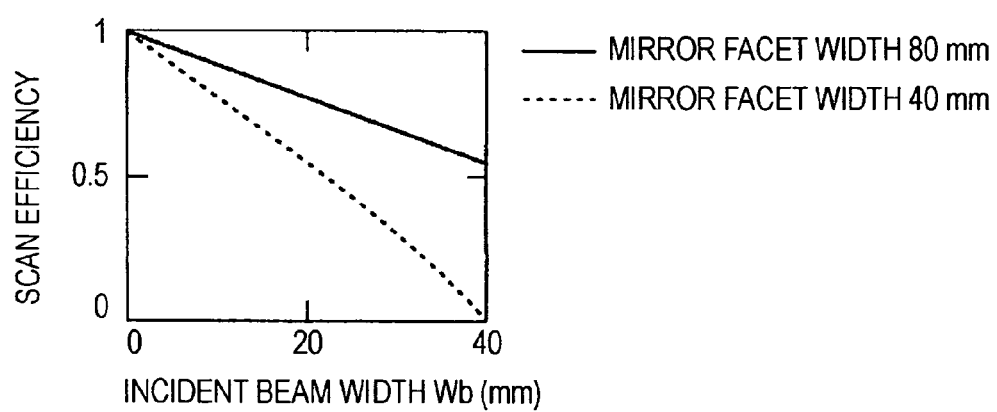
FIG. 4 is a graph illustrating a relationship between the incident beam width and scan efficiency.

The relationship between the scan efficiency Eff and the incident beam width on the mirror facet is shown in FIG. 4.

Figure 5:
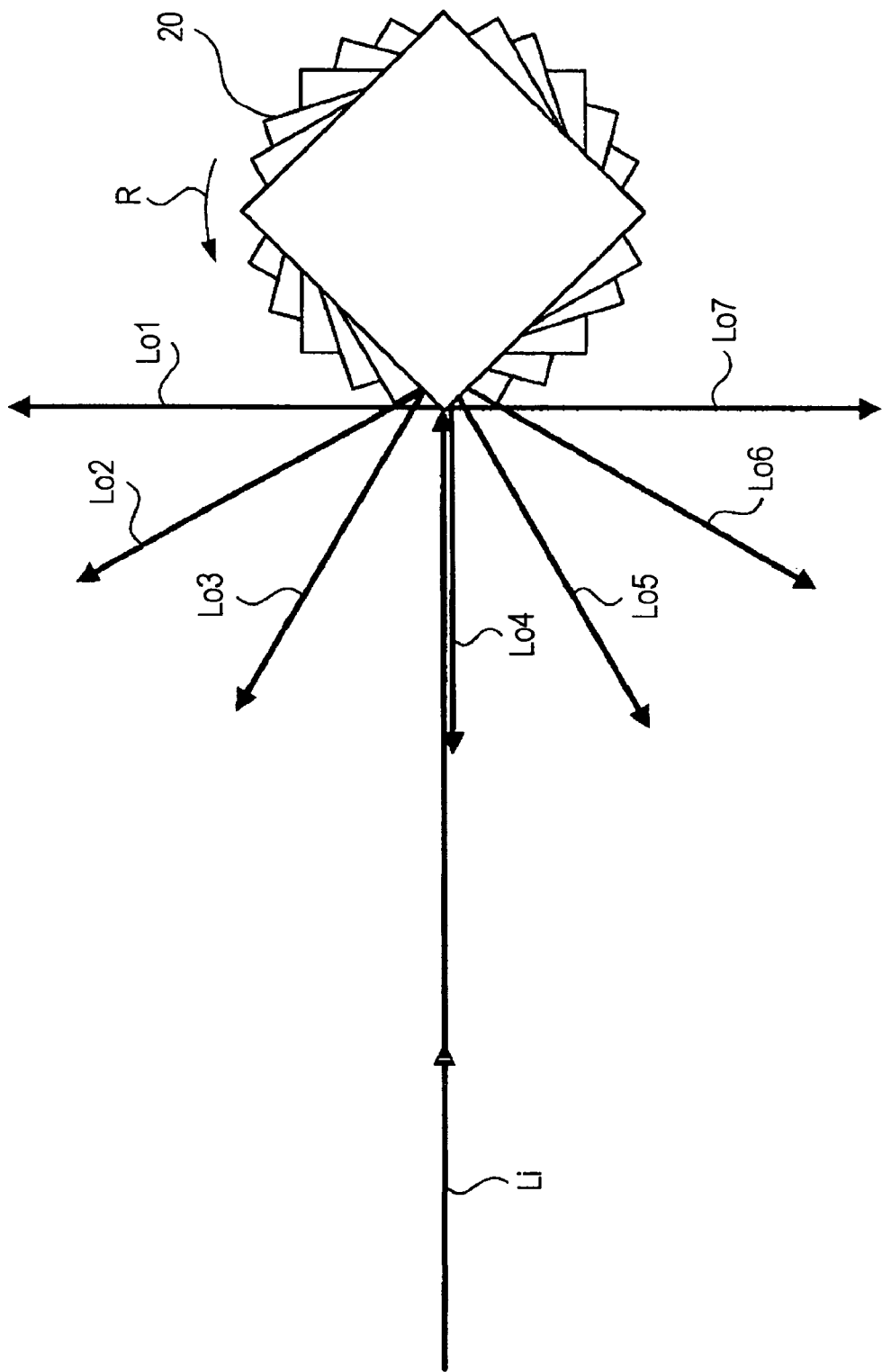
FIG. 5 is a diagram illustrating the movement of a reflected light beam in accordance with the rotation of a polygon scanner.

For example, when, as shown in FIG. 5, the polygon scanner 20 with four mirror facets is used, an incident beam Li is continually reflected, as shown by reflected light beams indicated by arrows Lo1, Lo2, Lo3 . . . , Lo6, and Lo7, as the polygon scanner 20 rotates in a direction indicated by an arrow R. If the incident beam is an ideal beam having a width of zero, the effective optical scan angle is 180 degrees. For example, when a polygon scanner with three mirror facets (not shown) is used, the effective optical scan angle is 240 degrees.

However, in practical applications, since the incident beam has a certain width, the effective optical scan angle is limited. That is, during one revolution of the polygon scanner 20, the incident light beam is suitably reflected as reflected light beam Lo in an effective scan period 42 shown in FIGS. 6B to 6E. In contrast, in ineffective periods 41 shown in FIGS. 6A and 6F, since the incident beam Li is incident on the ridge line of the polygon scanner 20, the incident beam Li is divided in two directions, that is, is divided into light beams indicated by arrows Loa and Lob. It is desirable that a ratio of the effective scan period 42 to the ineffective periods 41 is high.

In addition, in a display using a laser, the occurrence of speckle degrades the quality of an image. A method for reducing the speckle contrast is proposed in which the light beam is divided using, for example, a diffuser and the divided light beams are incident on a screen at different angles so that different speckle patterns are generated. Thereafter, the different speckle patterns are overlapped so that the intensity of the light beam over the screen is made uniform. In this way, the occurrence of speckle is reduced. Accordingly, to obtain the image quality sufficient for viewing, the light beam needs to be effectively expanded within the projection F-number in accordance with the projection environment. That is, the incident beam width needs to be maximized.

Figure 7A:
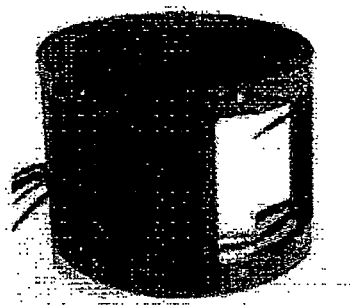
FIG. 7A is a schematic illustration of a perspective view of an exemplary polygon scanner.
Figure 7B:
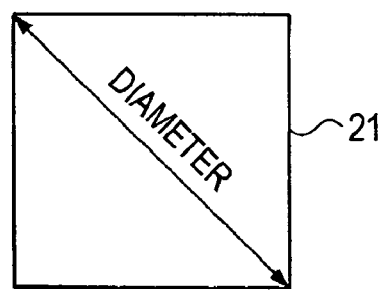
FIGS. 7B and 7C illustrate the diameter of the polygon scanner.
Figure 7C:
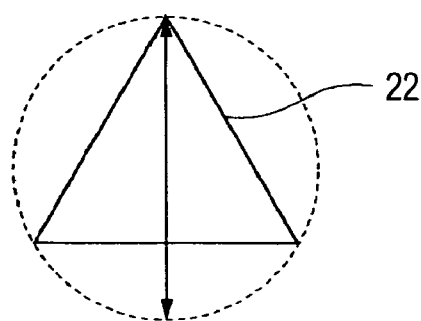

Furthermore, the size and the shape of the polygon scanner are limited. For example, in polygon scanners having a widely used structure shown by the schematic perspective view of FIG. 7A, the diameter of the polygon scanner 20, that is, the diameter of a circle that circumscribes a cross section (a polygon) of the polygon scanner that is perpendicular to the rotation axis of the facets is defined as the diameter of the polygon scanner. When, as shown in FIG. 7B, the polygon scanner 21 has four mirror facets, the length of the diagonal line of the cross section is defined as the diameter of the polygon scanner. In contrast, when, as shown in FIG. 7C, the polygon scanner 22 has three mirror facets, the diameter of a circle (shown by a dotted line) that circumscribes the triangle forming the cross section is defined as the diameter of the polygon scanner. This diameter Dm is expressed using the number of mirror facets Nm and the width of the mirror facet Wm as follows:

$$Dm = \frac{Wm}{\sin\left(\frac{180°}{Nm}\right)} \quad (3)$$

Figure 8:
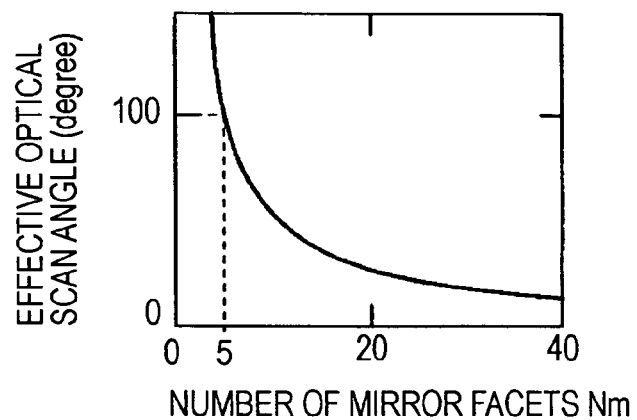
FIG. 8 is a graph illustrating a relationship between the number of mirror facets and the effective optical scan angle.

If the width of the mirror facet Wm is maintained to be constant in order to obtain a sufficient light use efficiency of the scan light, the effective optical scan angle Θ is decreased in accordance with the increase of the number of mirror facets Nm, as shown in FIG. 8. In FIG. 8, the width of the mirror facet is 80 mm and the incident beam width is 20 mm.

In general, the effective optical scan angle Θ that can provide an immersive sense of presence to viewers is 100°. As can be seen from FIG. 8, to obtain the effective optical scan angle Θ of 100°, a polygon scanner having five or less mirror facets is required.

Figure 9:
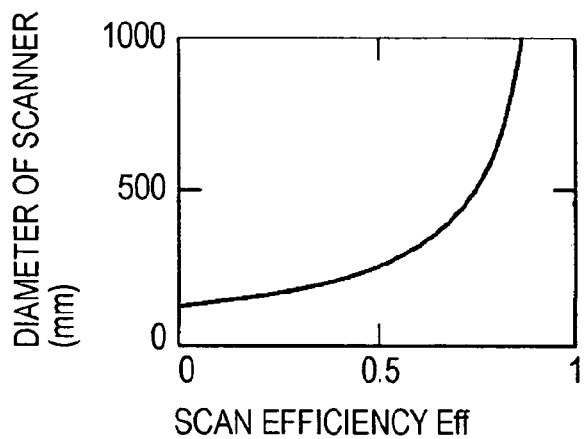
FIG. 9 is a graph illustrating a relationship between the scan efficiency and a diameter of the polygon scanner having twenty mirror facets.
Figure 10:
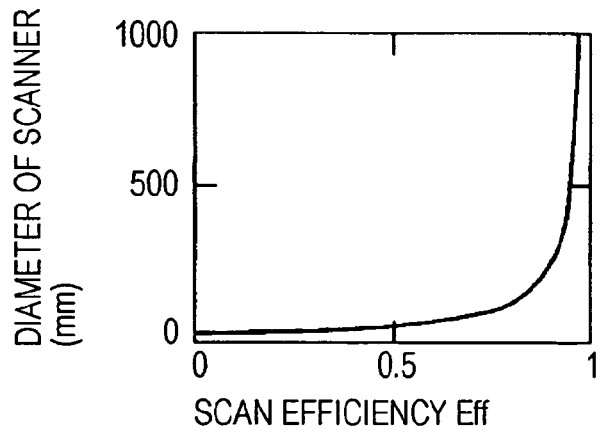
FIG. 10 is a graph illustrating a relationship between the scan efficiency and a diameter of the polygon scanner having four mirror facets.
Figure 11:
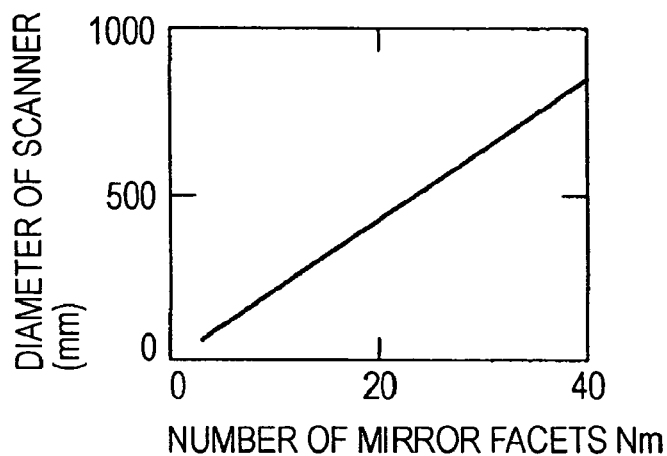
FIG. 11 is a graph illustrating a relationship between the number of mirror facets and the diameter of the polygon scanner.

In addition, to increase the scan efficiency Eff, the diameter of the polygon scanner needs to be increased, as shown in FIGS. 9 and 10. In FIGS. 9 and 10, the change in the diameter of the scanner in accordance with the change in the scan efficiency Eff is shown when the incident beam width is 20 mm. Note that, in FIG. 9, the number of mirror facets is 20 whereas, in FIG. 10, the number of mirror facets is 4. FIGS. 9 and 10 indicate that the scanner having four mirror facets can provide a smaller diameter and a higher scan efficiency Eff than the scanner having twenty mirror facets. The relationship between the number of mirror facets and the diameter of the scanner is shown in FIG. 11. In FIG. 11, the incident beam width is 20 mm and the scan efficiency Eff is 0.7.

If the polygon scanner is too large, it is disadvantageously difficult to reduce the size of the body of the image projection apparatus. In addition, the manufacturing cost of a polygon scanner having a diameter of more than 120 mm becomes significantly high due to the difficulty of manufacturing a multifaceted polygon scanner.

Furthermore, the ridge portion of a polygon scanner having three or less mirror facets has an acute angle. Accordingly, the angular velocity rapidly becomes unstable due to high air resistance known as "windage loss". In addition, sound noise is generated. Therefore, to realize an image display of a high sense of presence that provides a wide color range, a high resolution, and a wide field of view, it is desirable that the polygon scanner has four or five mirror facets.

Still furthermore, the angle error between the mirror facets of the polygon scanner, such as an error relating to the perpendicularity of the facet, causes the resolution of the image on the screen to deteriorate. When a polygon scanner having four or five mirror facets is used in order to reduce the size of the polygon scanner, a polygon scanner having four mirror facets is the most desirable since the polygon scanner having four mirror facets has parallel facets and the angle between the mirror facets is 90 degrees. This structure facilitates low-cost and high-precision fabrication of the mirror facets of the polygon scanner by using the opposite facets.

As noted above, to realize an image display having a wide color range, a high resolution, and a wide field of view that provide a high sense of presence, it is desirable that the polygon scanner has four or five mirror facets. In addition, to realize low-cost and high-precision fabrication of the facets, the polygon scanner having four mirror facets is the most desirable.

For the image projection apparatus according to the present embodiment, the height of the image, that is, the height of the screen is determined by the multiplication factor of the projection lens. In contrast, the width of the image is determined by the number of mirror facets. Consequently, the height and the width of the image can be independently determined, i.e., the aspect ratio of the image can be freely determined.

When an angle-variable returning mirror is disposed between the projection lens and the polygon scanner so that the optical axis is changed to a direction perpendicular to the scan direction of the polygon scanner in accordance with the inclined angle of each mirror facet, the degradation of the quality of the image due to the variation in the perpendicularity of the mirror facets can be minimized.

Furthermore, when the angle of the angle-variable returning mirror is changed in the vertical direction by an angle corresponding to 0.5 pixels per frame, the resolution of the one-dimensional spatial light modulation element can be virtually doubled.

Another embodiment of the present invention is described next in which the rotation speed of a polygon scanner is controlled in accordance with the resolution of an image signal in the scan direction or a frame rate.

Figure 12:
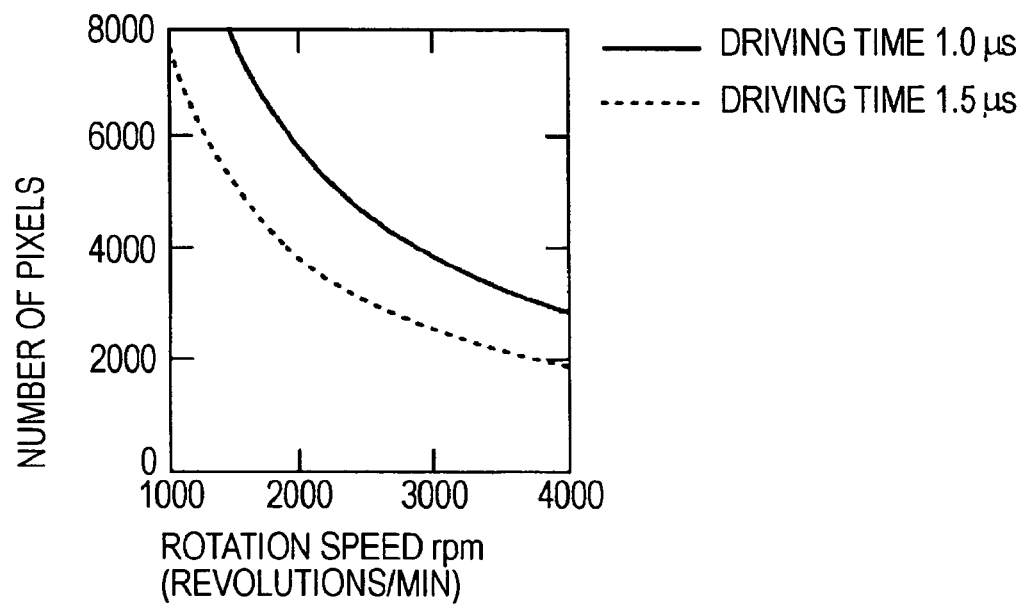
FIG. 12 is a graph illustrating a relationship between the rotation speed of the polygon scanner and the number of pixels.

In general, in an image projection apparatus in which a one-dimensional spatial light modulation element scans a light beam in a direction perpendicular to the long axis thereof, the resolution of an image in the lateral direction is changeable within the modulation speed of the one-dimensional spatial light modulation element. When a polygon scanner is used for scanning, the number of horizontal pixels Npixel of a displayable image is expressed as follows:

$$Npixel = \frac{60 \times Eff}{Nm \times rpm \times Tpixel} \quad (4)$$

where Tpixel represents the driving time of a pixel of the one-dimensional spatial light modulation element and rpm represents the rotation speed of a polygon scanner (revolutions per minute). FIG. 12 illustrates a relationship between the rotation speed and the number of pixels. In FIG. 12, the width of the mirror facet is 80 mm, the number of mirror facets is four, and the incident beam width is 20 mm. The solid line indicates the relationship in the case of the one-dimensional spatial light modulation element having a driving time of 1 μs while the dotted line indicates the relationship in the case of the one-dimensional spatial light modulation element having a driving time of 1.5 μs. As can be seen from FIG. 12, when a four-facet polygon scanner rotating at 1000 rpm is used in the one-dimensional spatial light modulation element having a driving time of 1.5 μs, a resolution of about 8K (i.e. 8000) pixels can be provided. If the rotation speed is increased to 4000 rpm, a resolution of about 2K (i.e. 2000) pixels can be provided. At that time, if the rotation speed is changed from 1000 rpm to 4000 rpm for a one-dimensional spatial light modulation element having 1K pixels, a 1K×8K two-dimensional image to a 1K×2K two-dimensional image can be continuously provided. Thus, the number of pixels in the horizontal direction can be freely selected.

In addition, a frame rate fps in accordance with the change in the rotation speed can be given by the following equation:

$$fps = \frac{Nm \times rpm}{60} \quad (5)$$

Figure 13:
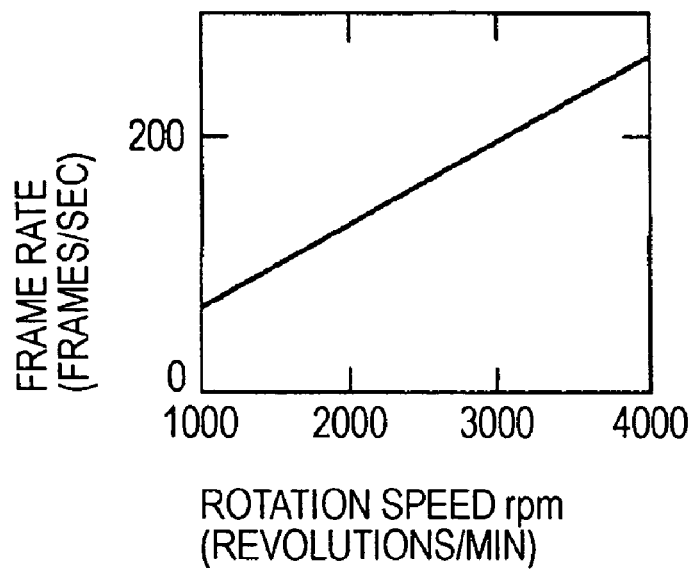
FIG. 13 is a graph illustrating a relationship between the rotation speed of the polygon scanner and a frame rate.

As shown in FIG. 13, when a four-facet polygon scanner is used, the four-facet polygon scanner rotating at 1000 rpm can realize 60 fps while the four-facet polygon scanner rotating at 4000 rpm can realize 240 fps.

Furthermore, when the rotation speed of the polygon scanner is changed, the number of pixels in the horizontal direction is changed without changing the width of the image. That is, the width of the image per pixel is changed. The width of the image in a vertical direction is determined by the length of the one-dimensional spatial light modulation element and the projection multiplication factor. By changing the focal length of the projection lens, the width of the image in the vertical direction can be freely changed. When an image is projected using a 1088-pixel one-dimensional spatial light modulation element having a length of $H_{SLM}$ and the shape of the pixel is square, a focal length fproj of the projection lens is expressed as follows:

$$fproj = \frac{H_{SLM}}{1088} \times \frac{360°}{\Theta} \times \frac{Npixel}{2\pi} \quad (6)$$

Figure 14:
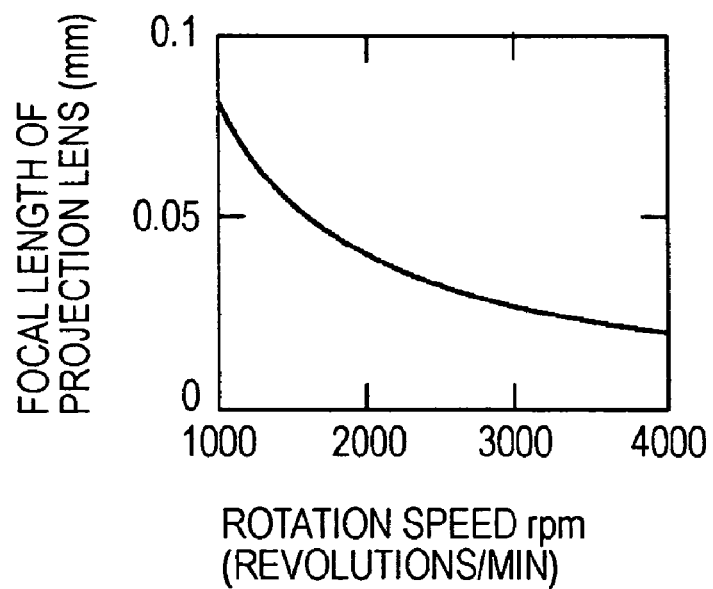
FIG. 14 is a graph illustrating a relationship between the rotation speed of the polygon scanner and a focal length of a projection lens.

When changing the rotation speed of the polygon scanner using a one-dimensional spatial light modulation element having a length ($H_{SLM}$) of 27.7 mm, the focal length fproj of the projection lens should be changed, as shown in FIG. 14. However, if a pixel of a square shape is not needed, changing the focal length fproj of the projection lens is not needed.

As noted above, according to the present embodiment, for the image projection apparatus that can control the rotation speed of the polygon scanner, the operating condition of the image projection apparatus can be changed in accordance with the vertical and horizontal resolutions of the input image, the horizontal to vertical ratio (the aspect ratio), and the frame rate without decreasing the light use efficiency. That is, only one image projection apparatus can meet these operating conditions, and therefore, a plurality of known image projection apparatuses can be replaced by this image projection apparatus.

Figure 15:
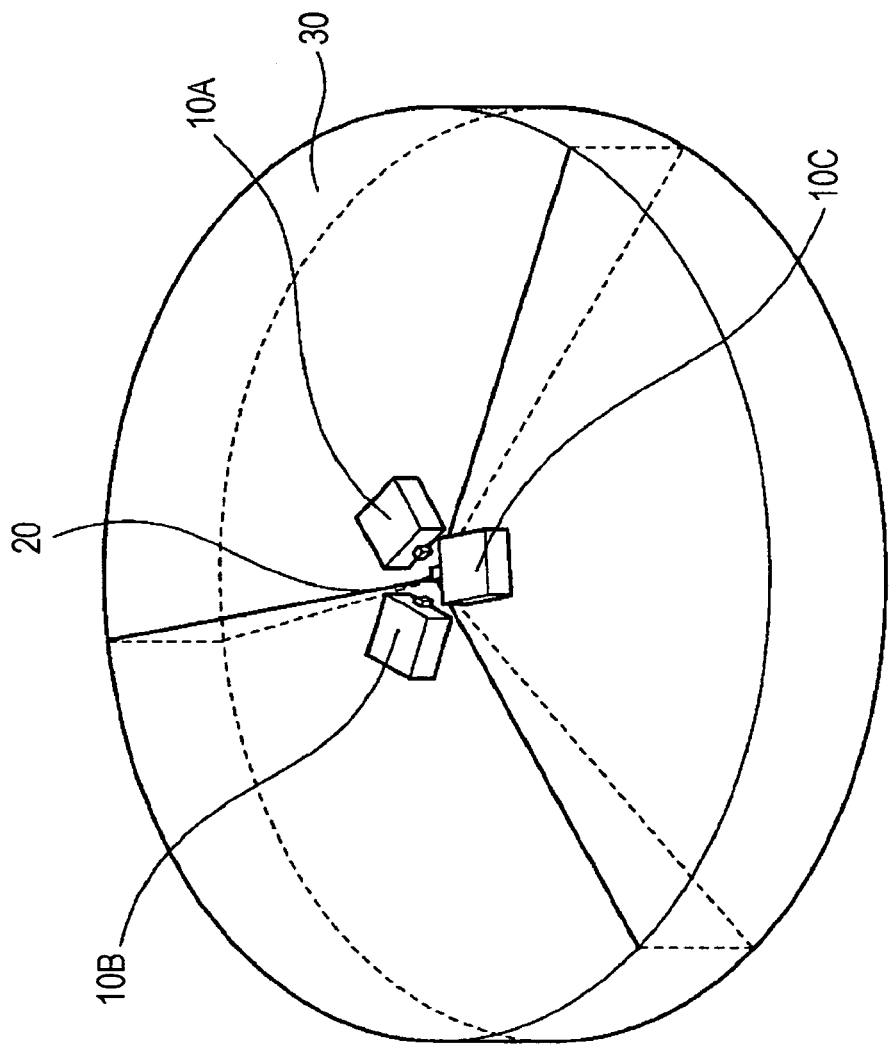
FIG. 15 is a schematic illustration of a structure of an image projection apparatus according to an embodiment of the present invention.

In addition, according to the present embodiment, as shown by the schematic structure in FIG. 15, when the image projection apparatus includes three modulation optical systems 10A, 10B, and 10C and the polygon scanner 20, the image projection apparatus can make tiling of three images (like the Megavision) so as to project the light of the images onto the screen 30 having a substantially cylindrical shape and a wide field of view of 360°.

An image projection apparatus according to another embodiment of the present invention is described next in which two modulation optical systems and one polygon scanner are used and the optical axis of each of the two modulation optical systems is eccentric with respect to the rotation axis of the polygon scanner.

Figure 16:
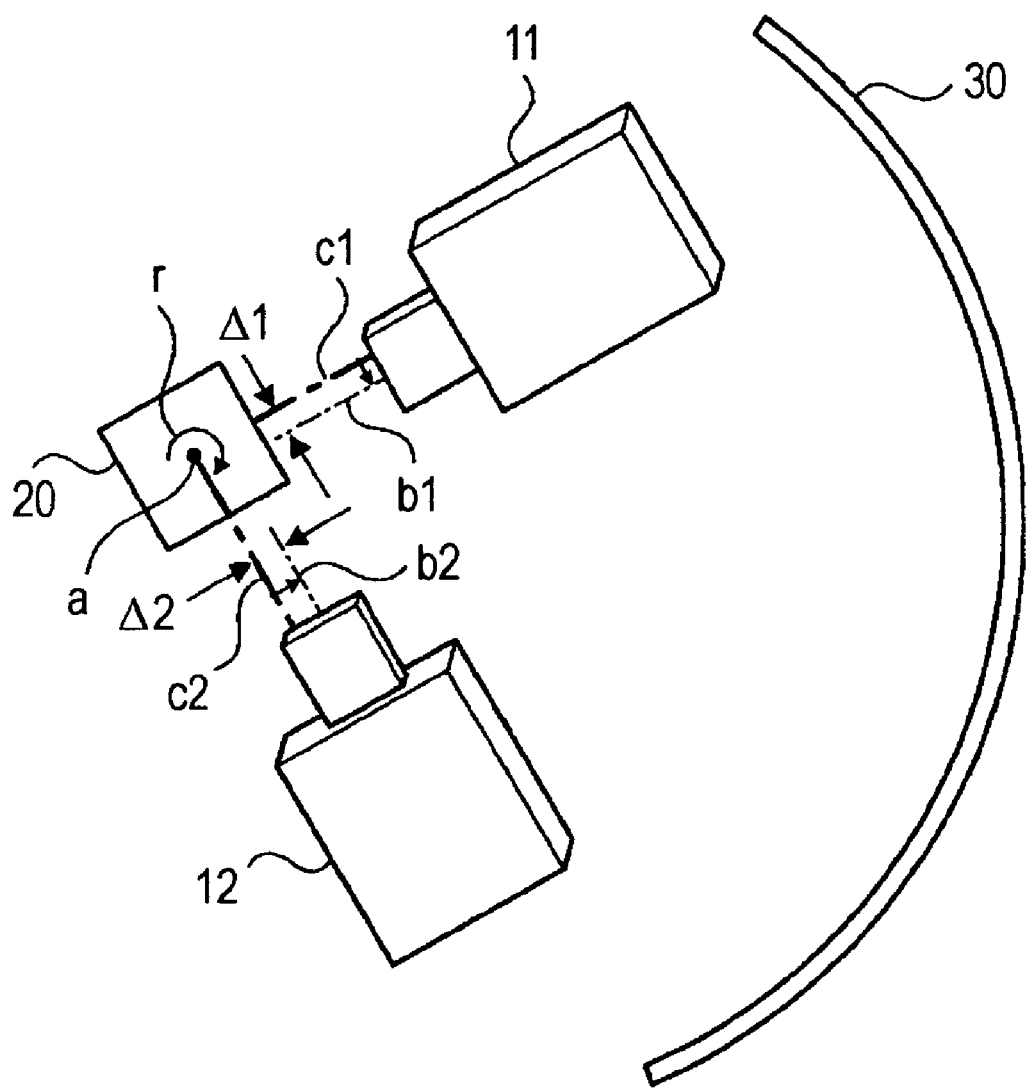
FIG. 16 is a schematic illustration of a structure of an image projection apparatus according to an embodiment of the present invention.

In this embodiment, as shown in FIG. 16, the image projection apparatus includes two modulation optical systems 11 and 12 that modulate and output a light beam using a one-dimensional spatial light modulation element. The image projection apparatus further includes a polygon scanner 20 that scans the light beam modulated by the one-dimensional spatial light modulation element to form a two-dimensional image. Each of an optical axis b1 of the modulation optical system 11 and an optical axis b2 of the modulation optical system 12 is eccentric with respect to a rotation axis a of the polygon scanner 20. That is, the optical axes b1 and b2 of the modulation optical systems 11 and 12 are offset from axes c1 and c2 that are perpendicular to the rotation axis a of the polygon scanner 20 by distances Δ1 and Δ2, respectively. In FIG. 16, the cylindrical screen 30 is used.

Figure 17:
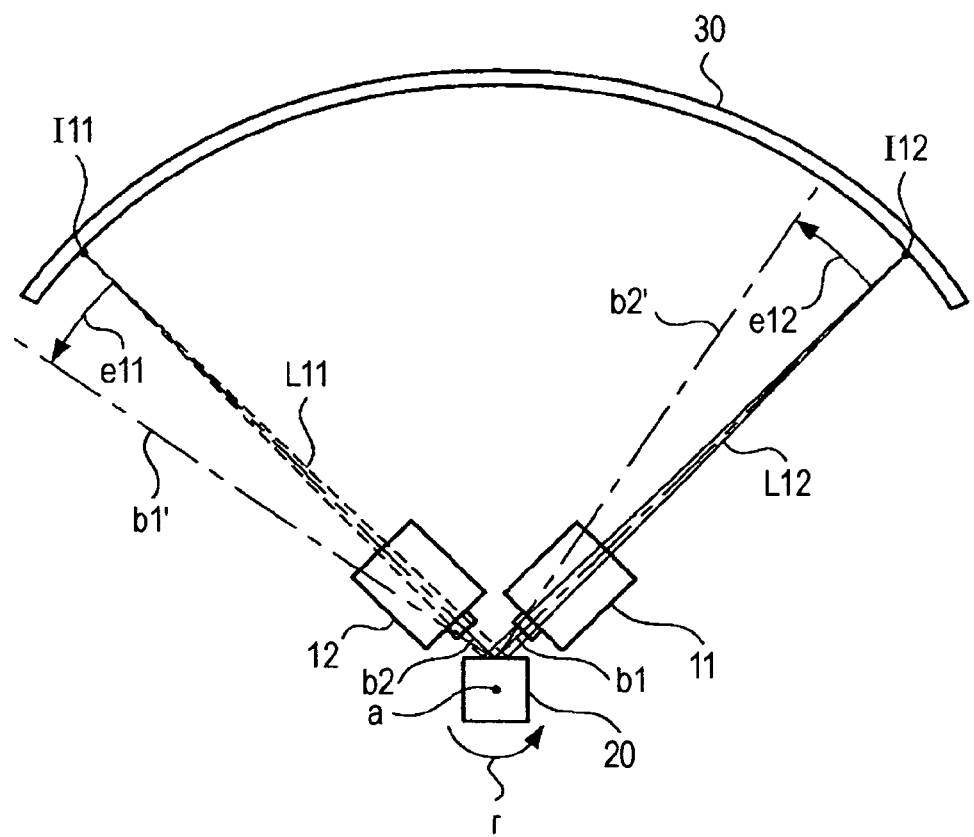
FIG. 17 illustrates a scanning state of the image projection apparatus according to the embodiment of the present invention.

In such a structure, when the modulation optical systems 11 and 12 are disposed so that the angle between the optical axis b1 and the optical axis b2 is substantially the same as the angle between the neighboring facets of the polygon scanner 20, the timing for scanning an image varies, as shown in FIG. 17. Note that similar numbering will be used in describing FIG. 17 as was utilized above in describing FIG. 16, and therefore, the descriptions thereof are not repeated. In this case, a light beam emitted from the modulation optical system 11 is projected onto the screen 30, as shown by a dotted line L11. The light beam is scanned as shown by an arrow e11 so that an image I11 is displayed. An alternate long and short dash line b1' represents the optical axis of a light beam reflected by the polygon scanner 20 and output from the modulation optical system 11. A light beam emitted from the modulation optical system 12 is projected onto the screen 30, as shown by a solid line L12. Thus, the light beam is scanned as shown by an arrow e12 so that an image I12 is displayed. That is, in this case, a frame of the modulation optical system 12 is inserted between frames of the modulation optical system 11. The inserted image is out of phase with the other frames of the modulation optical system 11 by half a frame.

Let Δ1=Δ2=Δ. Let rm be the radius of a circle inscribed inside a cross section (a polygon) of the polygon scanner 20 that is perpendicular to the rotation axis of mirror facets and Nm be the number of mirror facets. When the optical axes of the modulation optical systems 11 and 12 are eccentric so that the following condition:

$$\Delta=\Delta1=\Delta2=rm \times \sin[90°/Nm] \quad (7)$$

is satisfied, the positions at which images of the two modulation optical systems 11 and 12 are displayed are the same.

Accordingly, when the two modulation optical systems 11 and 12 display images whose phases are shifted with respect to each other by half a frame at the same position and operate at 120 Hz, the images can be displayed at a frame rate of 240 Hz. Thus, a high frame rate that cannot be realized by known image projection apparatuses can be achieved.

TABLEs 1 and 2 show computation results of the diameter of a polygon scanner, the maximum optical deflection angle, the number of vertices, eccentric values, and scan efficiencies computed using equation (7) when a four-facet polygon scanner and a six-facet polygon scanner are used.

TABLE 1

| Diameter (mm) | Maximum optical deflection angle | Number of vertices | Eccentric value (mm) | Scan Efficiency |
| --- | --- | --- | --- | --- |
| 78.07097 | 80 | 4.00 | 10.5628108 | 0.444398 |
| 77.10501 | 100 | 4.00 | 10.4327903 | 0.555277 |
| 84.99576 | 120 | 4.00 | 11.4995665 | 0.666651 |
| 108.3685 | 140 | 4.00 | 14.6628562 | 0.777415 |

TABLE 2

| Diameter (mm) | Maximum optical deflection angle | Number of vertices | Eccentric value (mm) | Scan Efficiency |
| --- | --- | --- | --- | --- |
| 169.9761 | 60 | 6.00 | 19.050041 | 0.499959 |
| 173.9377 | 70 | 6.00 | 19.502922 | 0.582892 |
| 189.8519 | 80 | 6.00 | 21.28123 | 0.666445 |
| 224.7066 | 90 | 6.00 | 25.183051 | 0.749979 |

As can be seen from TABLEs 1 and 2, to obtain substantially the same scan efficiency, the use of the four-facet polygon scanner can reduce the diameter of the polygon scanner. Accordingly, even in this case, it is desirable that the four-facet polygon scanner is used.

As noted above, according to this embodiment of the present invention, by using a four- or five-facet polygon scanner and, more preferably, a four-facet polygon scanner, a compact, cost-effective, high-resolution, wide field-of-view image projection apparatus can be achieved.

Additionally, according to this embodiment of the present invention, the image projection apparatus can display an image on a cylindrical screen without distortion even at the four corners of the screen. Furthermore, the image projection apparatus can provide viewers with a wide field of view in a relatively narrow space, i.e., a high sense of presence.

Still furthermore, the image projection apparatus including a diffractive electrostatic drive element as a one-dimensional spatial light modulation element can finely control the gradation of an image since the image projection apparatus uses the interference of a coherent light beam, such as a laser beam. As a result, an image having an excellent image quality can be displayed.

In addition, the image projection apparatus that can control the rotation speed of the polygon scanner in accordance with the resolution of an image signal in the scan direction or the frame rate can display a horizontally long image at any desired frame rate from a low to high frame rate without degrading the quality of the image.

Yet still furthermore, the image projection apparatus including one polygon scanner and a modulation optical system having the optical axis eccentric with respect to the rotation axis of the polygon scanner can display a horizontally long image having an excellent image quality at a frame rate that is double the normal frame rate.

While the image projection apparatus according to the present invention has been described with reference to the foregoing embodiments, the present invention is not limited thereto.

It should be understood by those skilled in the art that, in terms of the type of one-dimensional spatial light modulation element, the material of the one-dimensional spatial light modulation element, and the structure of the optical components in the modulation optical system, various modifications, combinations, sub-combinations and alterations may occur depending on design requirements and other factors insofar as they are within the scope of the appended claims or the equivalents thereof.

What is claimed is:

1. An image projection apparatus comprising:
    two modulation optical systems, each modulating and outputting a light beam using a one-dimensional spatial light modulating element; and
    a polygon scanner configured to scan the light beam modulated by the one-dimensional spatial light modulating element to form a two-dimensional image;
    wherein each of optical axes of the two modulation optical systems is eccentric with respect to a rotation axis of the polygon scanner, and
    wherein an eccentric value A of each of the optical axes of the two modulation optical systems with respect to the rotation axis of the polygon scanner is given by the following expression:

$\Delta = rm \times \sin[90°/Nm]$ where rm denotes a radius of a circle inscribed inside a cross section of mirror facets of the polygon scanner and Nm denotes a number of mirror facets.

* * * * *